(12) United States Patent
Jackson et al.

(10) Patent No.: US 8,203,589 B2
(45) Date of Patent: Jun. 19, 2012

(54) SYSTEM FOR MANAGING VIDEO VOICEMAIL

(75) Inventors: James Jackson, Austin, TX (US); Anup Karnalkar, Allen, TX (US); Jyotindra Shah, Austin, TX (US)

(73) Assignee: AT&T International Property I, LP, Atlanta, GA (US)

( * ) Notice: Subject to any disclaimer, the term of this patent is extended or adjusted under 35 U.S.C. 154(b) by 1320 days.

(21) Appl. No.: 11/852,060

(22) Filed: Sep. 7, 2007

(65) Prior Publication Data

US 2009/0066781 A1 Mar. 12, 2009

(51) Int. Cl.
*H04M 7/14* (2006.01)
*H04M 11/00* (2006.01)

(52) U.S. Cl. .................. 348/14.01; 379/88.13

(58) Field of Classification Search .................. 370/260, 370/352; 348/14.01, 14.08; 379/88.13, 88.17
See application file for complete search history.

(56) References Cited

U.S. PATENT DOCUMENTS

| | | | |
|---|---|---|---|
| 5,371,534 A | 12/1994 | Dagdeviren et al. | |
| 5,717,857 A | 2/1998 | Burkman et al. | |
| 5,920,693 A | 7/1999 | Burkman et al. | |
| 6,529,500 B1 | 3/2003 | Pandharipande | |
| 7,102,663 B2 | 9/2006 | Crook | |
| 2002/0071429 A1* | 6/2002 | Donovan | 370/352 |
| 2003/0071890 A1 | 4/2003 | McClure | |
| 2004/0203608 A1 | 10/2004 | Osann, Jr. | |
| 2005/0162507 A1 | 7/2005 | Du | |
| 2007/0053346 A1 | 3/2007 | Bettis et al. | |
| 2007/0058681 A1 | 3/2007 | Bettis et al. | |
| 2007/0064743 A1 | 3/2007 | Bettis et al. | |
| 2007/0116198 A1 | 5/2007 | Fujita-Yuhas | |

OTHER PUBLICATIONS

Karnalkar et al., "System for Video Call Processing", U.S. Appl. No. 11/763,814 dated Jun. 15, 2007, 20 Pages.

* cited by examiner

*Primary Examiner* — Tuan Nguyen
(74) *Attorney, Agent, or Firm* — Guntin Meles & Gust, PLC; Douglas Schnabel

(57) ABSTRACT

A system that incorporates teachings of the present disclosure may include, for example, a communication device having a controller adapted to establish communications with a voicemail system over a Public Switched Telephone Network port of the communication device, receive from the voicemail system by way of a broadband port of the communication device an invitation to switch to a video call over the broadband port, transmit a Session Initiation Protocol message to establish video communications with the voicemail system, and transmit to the voicemail system a video message to be recorded by the voicemail system as a video voicemail message. Additional embodiments are disclosed.

24 Claims, 7 Drawing Sheets

104

SYSTEM FOR MANAGING VIDEO VOICEMAIL

FIELD OF THE DISCLOSURE

The present disclosure relates generally to communication techniques and more specifically to a system for managing video voicemail.

BACKGROUND

The adoption rate of phones with video communication capability has been slow due in part to privacy concerns and further due to the complex setup and operations of a video call with webcams and videophones. Some consumers do not want to be seen at times when it may be inconvenient or undesirable. For instance, a consumer may not want to engage in a video conference call with strangers or while engaged in activities that are normally considered private.

DETAILED DESCRIPTION

In one embodiment of the present disclosure, a communication device can have a controller adapted to establish communications with a voicemail system over a Public Switched Telephone Network (PSTN) port of the communication device, receive from the voicemail system by way of a broadband port of the communication device an invitation to switch to a video call over the broadband port, transmit a Session Initiation Protocol (SIP) message to establish video communications with the voicemail system, and transmit to the voicemail system a video message to be recorded by the voicemail system as a video voicemail message.

In one embodiment of the present disclosure, a computer-readable storage medium operating in a communication device can have computer instructions for establishing a circuit-switched communication session with a voicemail system, and initiating a transition to a video Internet Protocol (IP) communication session with the voicemail system while the circuit-switched communication session is active between the communication device and the voicemail system.

In one embodiment of the present disclosure, a voicemail system can have a controller adapted to transmit to a communication device an invitation to switch from an active circuit-switched communication session to a video IP communication session.

Figure 1:
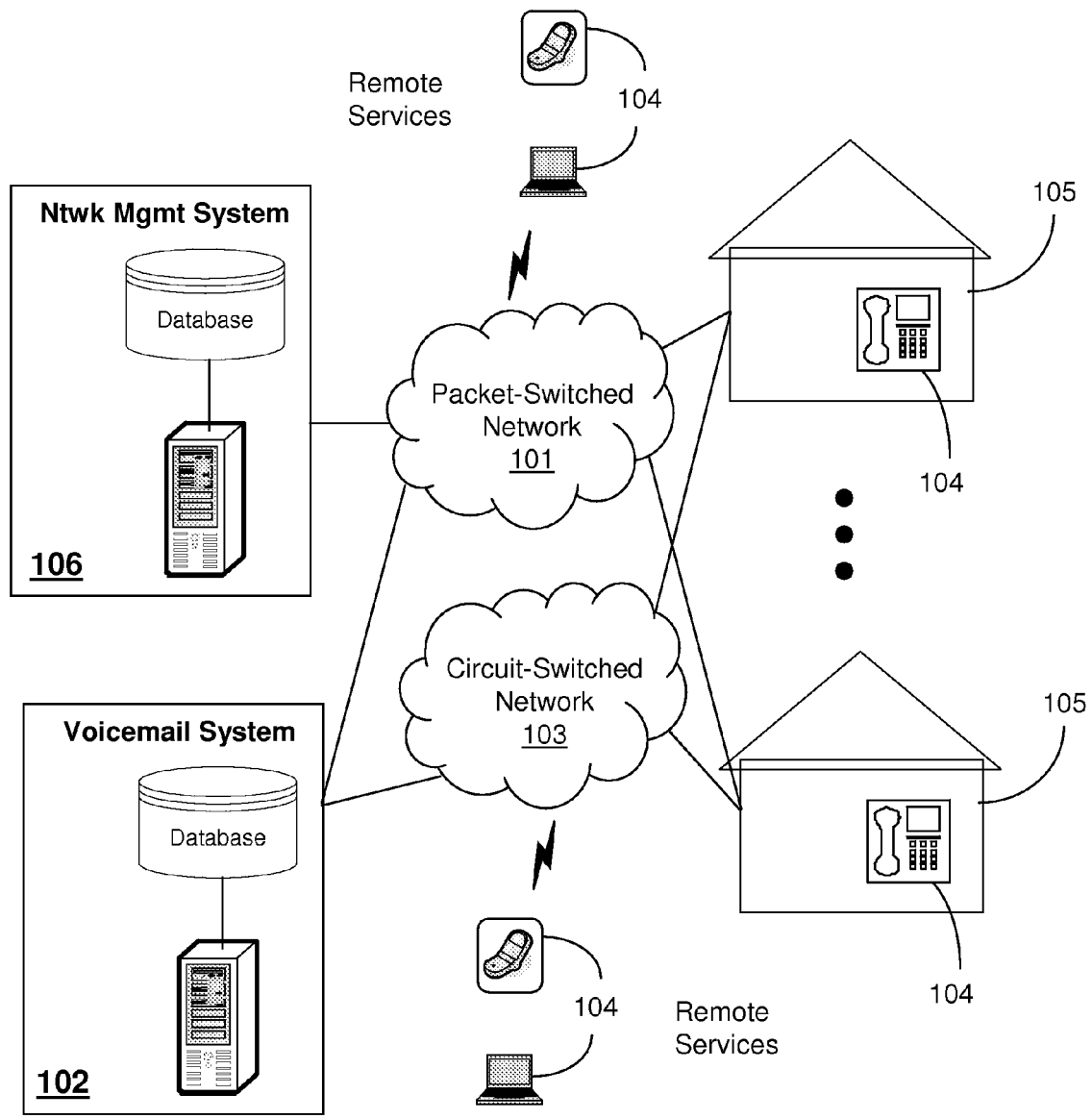
FIGS. 1-2 depict exemplary embodiments of a communication system.

FIG. 1 depicts an exemplary embodiment of a communication system 100. The communication system 100 can comprise a Voicemail System (VMS) 102 operably coupled to one or more communication devices (CD) 104 housed in a building 105 or roaming about the communication system 100. The CD 104 can establish communications with other CDs or the VMS 102 by way of a common packet-switched network such as an Internet Protocol (IP) network 101, or a circuit-switched network such as a Public Switched Telephone Network (PSTN) 103. The VMS 102 can be used to record voice-only messages supplied over the PSTN network 103 or IP network 101, or video voicemail messages only by way of the IP network 101. The communication system 100 can also comprise a network management system (NMS) 102 operating for example as a proxy server or other suitable computing and communication device that can be accessed by the VMS 102 to determine the communication capabilities of a select CD 104.

Figure 2:
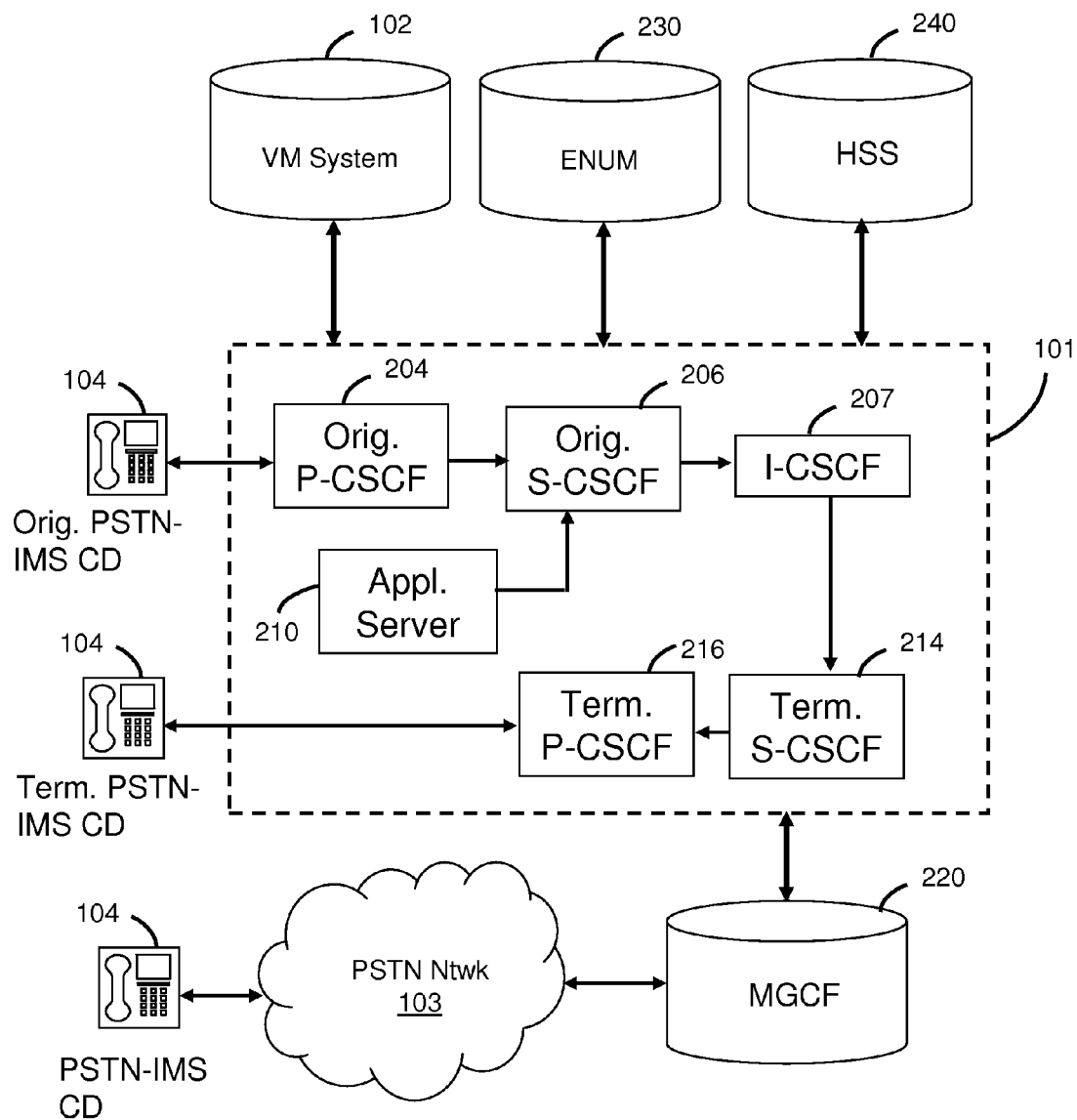

FIG. 2 depicts an exemplary embodiment of a communication system 200 employing an IP Multimedia Subsystem (IMS) network architecture (herein referred to as IMS network 200). IMS network 200 can be another representative embodiment of communication system 100 employing the IP and PSTN networks 101, 103.

The IP network 101 can comprise a Home Subscriber Server (HSS) 240, a tElephone NUmber Mapping (ENUM) server 230, and a number of common IMS network elements. The IP network 101 can be coupled to hybrid PSTN-IMS compliant communication devices (CDs) 104 which can communicate with the IP network 101 or the PSTN network 103.

IMS CDs 104 can register with the IP network 101 by contacting a Proxy Call Session Control Function (P-CSCF) which communicates with a corresponding Serving CSCF (S-CSCF) to register the CDs with an Authentication, Authorization and Accounting (AAA) technique supported by the HSS 240. To accomplish a communication session between IMS CDs, an originating IMS CD 104 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers.

For example, the application server 210 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit a query to the ENUM system 230 to translate an E.164 telephone number to a SIP Uniform Resource Identifier (URI) if the terminating CD is IMS compliant. If the terminating CD is a PSTN-only device, the ENUM system 230 can respond with an unsuccessful address resolution. In this instance the originating S-CSCF 206 will forward the call to a Media Gateway Control Function (MGCF) 220 that connects the call through the PSTN network 103 via a Breakout Gateway Control Function (not shown).

When the ENUM server 230 returns a successful address resolution with a SIP URI, the SIP URI is used by an Interrogating CSCF (I-CSCF) 207 to submit a query to the HSS 240 to identify a terminating S-CSCF 214 associated with the terminating IMS CD 104. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 104. The P-CSCF 216 then signals the IMS CD 104 to establish communications. The aforementioned process is symmetrical. Accordingly, the terms "originating" and "terminating" in FIG. 2 can be interchanged. It should also be noted that the hybrid IMS CDs 104 can begin a call via the PSTN network 103 and later switch to an IMS-compliant VoIP or video IP call.

The IP network 101 of FIG. 2 can be supplemented with the VMS 102 of FIG. 1. The VMS 102 can be an integral part of the application server 210 or an external IMS-compliant system that is accessible by the IP network. The VMS 102 can accept redirected PSTN or IMS calls from calling parties when a called party does not answer a call. The VMS 102 can provide a calling party options to record and store voice-only or video voicemail messages depending on the type of communication session used. The NMS 106 referred to in FIG. 1 can be an integral part of the HSS 240 for purposes of managing subscription information about the CDs 104.

Figure 3:
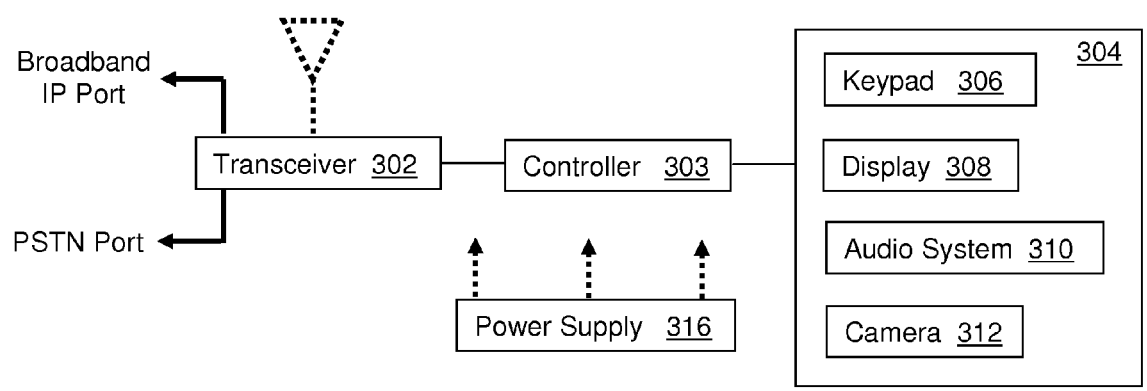
FIG. 3 depicts an exemplary embodiment of a communication device operating in the communication system.

FIG. 3 depicts an exemplary embodiment of the hybrid PSTN-IMS CD 104. The CD 104 can comprise a wireless and/or wireline transceiver 302, a user interface (UI) 304, a power supply 316, and a controller 303 for managing operations thereof. A circuit-switched communication port of the transceiver 302 can utilize common communication technologies to support PSTN or POTS (Plain Old Telephone System) communications. A packet-switched communication port of the transceiver 302 can utilize common communication technologies to support broadband cable, and/or xDSL communications. The circuit-switched communication port of the transceiver 302 can also utilize Digital Enhance Cordless Telecommunications (DECT) to support wireless communications with a base unit coupled to the PSTN network 103. The packet-switched port can utilize WiFi technology to achieve wireless communications by way of a base unit (e.g., modem/router) coupled to a broadband interface of the IP network 101.

In addition to the aforementioned communication technologies, the transceiver 302 can support other wireless access technologies such Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. Accordingly, the CD 104 can serve as a multimode communication device with versatility to operate locally or remote to building 105. It should be noted that other next generation wireline and wireless access technologies can also be applied to the present disclosure.

The UI 304 can include a keypad 306 with depressible or touch-sensitive buttons and a navigation element such as a navigation disk, button, roller ball, or flywheel for manipulating operations of the CD 104. The UI 304 can further include a display 308 such as monochrome or color LCD (Liquid Crystal Display) which can be touch-sensitive for manipulating operations of the CD 104 and for conveying still and video images to the end user of said device. The UI 304 can also include an audio system 310 that utilizes common audio technology for conveying and intercepting audible signals and a camera 312 utilizing common imaging technology for capturing still and video images. The camera 312 and audio system 310 can be used by the CD 104 to support video communications with other CDs and the VMS 102.

The power supply 316 can utilize common power management technologies such as replaceable batteries, supply regulation technologies, and charging system technologies for supplying energy to the components of the CD 104 and to facilitate portable applications. Depending on the type of power supply 316 used, the communication device 104 can be an immobile or portable CD. The controller 303 can utilize computing technologies such as a microprocessor and/or digital signal processor (DSP) with associated storage memory such a Flash, ROM, RAM, SRAM, DRAM or other like technologies for controlling operations of the CD 104. An end user can also utilize more than one type of CD 104 and migrate between CDs when desired.

Figure 4:
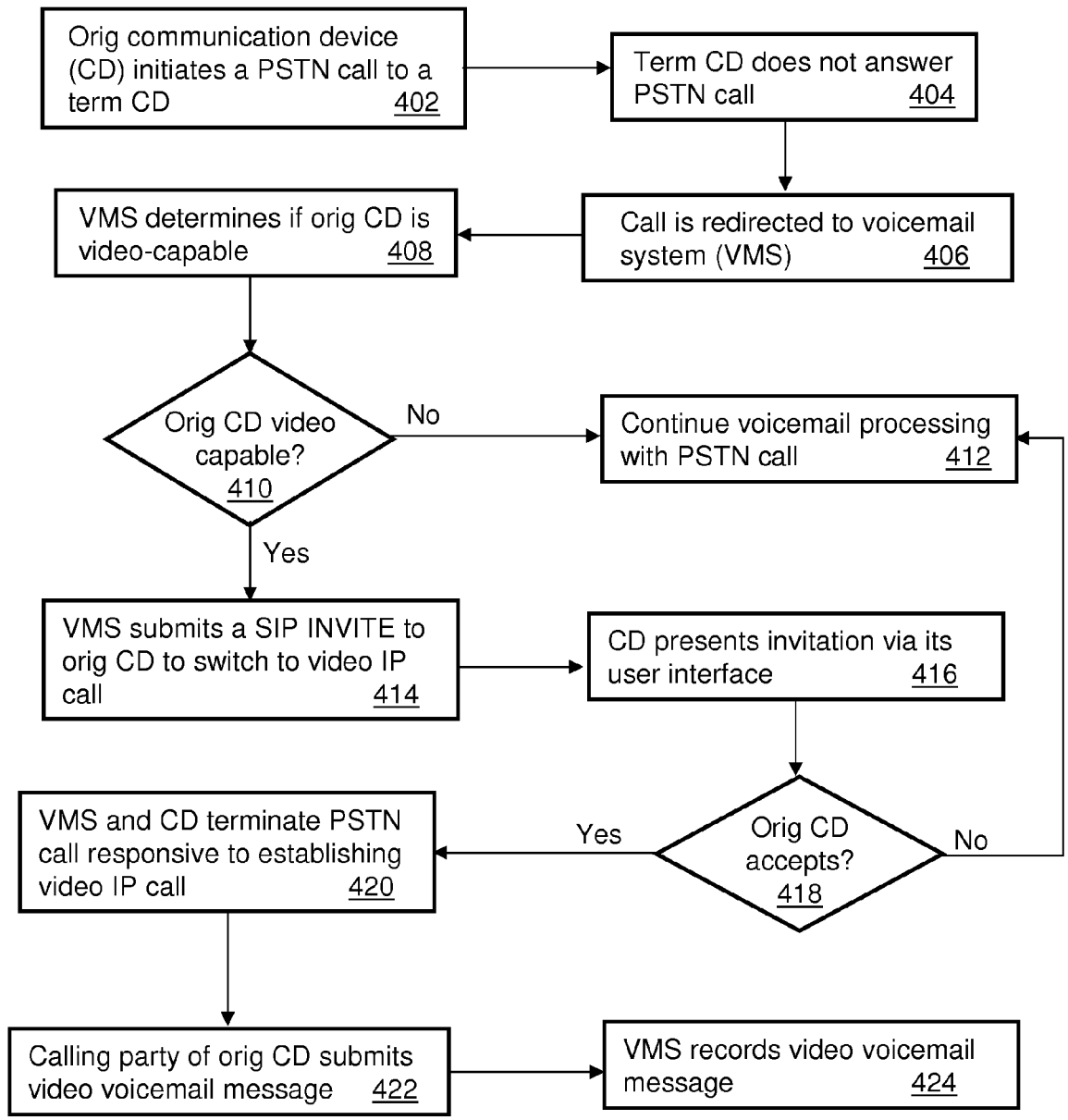
FIGS. 4-5 depict exemplary methods operating in portions of the communication system.

FIG. 4 depicts an exemplary method 400 operating in portions of the communication system 100 for recording voicemail messages. Method 400 begins with step 402 in which an originating CD 104 initiates by way of its circuit-switched communication port a PSTN call directed to a terminating CD. When a subscriber of the terminating CD 104 does not answer the call in step 404, the call is redirected in step 406 to the voicemail system (VMS) 102. The redirected call remains a PSTN call in this step. In step 408, the VMS 102 can determine whether the originating CD 104 is video-capable. This step can be accomplished a number of ways. For example, the VMS 102 can retrieve from SS7 signaling information of the PSTN call the calling party number of the CD 104. The VMS 102 can have in its memory a list of known calling party numbers identifying which devices are hybrid PSTN-IMS CDs and which are not. The list can be developed by the VMS 102 from a recorded history of previous calls engaged with a number of CDs 104.

Alternatively, the VMS 102 can submit to the ENUM system 230 the calling party number of the originating CD 104 as an E.164 number. If the ENUM 240 responds with a SIP URI, the VMS 102 can submit a SIP OPTIONS message to the originating CD 104 by way of the IP network 101 coupled to said CD's broadband port. If the CD 104 responds with a SIP OK message, the VMS 102 can record the association of the calling party number, the SIP URI and its ability to perform video messaging. In yet another embodiment, the VMS 102 can submit a SIP OPTIONS message to the NMS 106 (or the HSS 240 if the NMS is not an integral part thereof) to determine whether it is video-capable. If the NMS 106 responds with a SIP OK message, and a corresponding SIP Uniform Resource Identifier (URI) of the originating CD 104, the VMS 102 can record in its database the calling party number, the SIP URI, and its capability for video messaging for future use. If the VMS 102 detects the CD 104 is a PSTN-only CD, it can also record in its database an association of the calling party number with the limited voice-only communication capability of said device.

If the VMS 102 determines from any of the foregoing embodiments that the originating CD 104 is not video-capable, the VMS 102 can proceed to step 412 where it continues voicemail processing over the PSTN network 103. That is, the VMS 102 can present in this step by common means synthesized speech prompts to record a voicemail message of the calling party of the CD 104 in a voice-only format. When however the VMS 102 detects the CD 104 is video-capable, it proceeds to step 414 where it submits a SIP INVITE message to the originating CD 104 according to its SIP URI to invite the calling party of the CD to switch to a video IP call.

The originating CD 104 can present in step 306 the SIP INVITE message by way of its UI 304 in the form of a flashing hard or touch-sensitive button with an accompanying text message (e.g., "If you would like to record video voicemail, please select the video button. Otherwise, please select the video decline button."). Other suitable techniques for notifying the calling party of the invitation via the UI 304 can be used. If the SIP INVITE message transmitted by the VMS 102 is not accepted, the VMS 102 can continue voicemail processing over the PSTN network 103 as previously described. The VMS 102 can detect a decline in the invitation from a proactive manipulation of the UI 304 by the calling party, or from a time out due to a lack of response by the calling party.

If the invitation is accepted, the VMS 102 and the CD 104 can terminate in step 420 the PSTN call responsive to establishing the video IP call therebetween. At this point, the calling party of the originating CD 104 can submit a video voicemail message in step 422 using the camera 312 and audio system 310 of the UI 304 responsive to common directive prompts presented by the VMS 102. The VMS 102 can record in step 424 the video voicemail message for later retrieval by the called party (i.e., subscriber of the voicemail service provided by the VMS).

Figure 5:
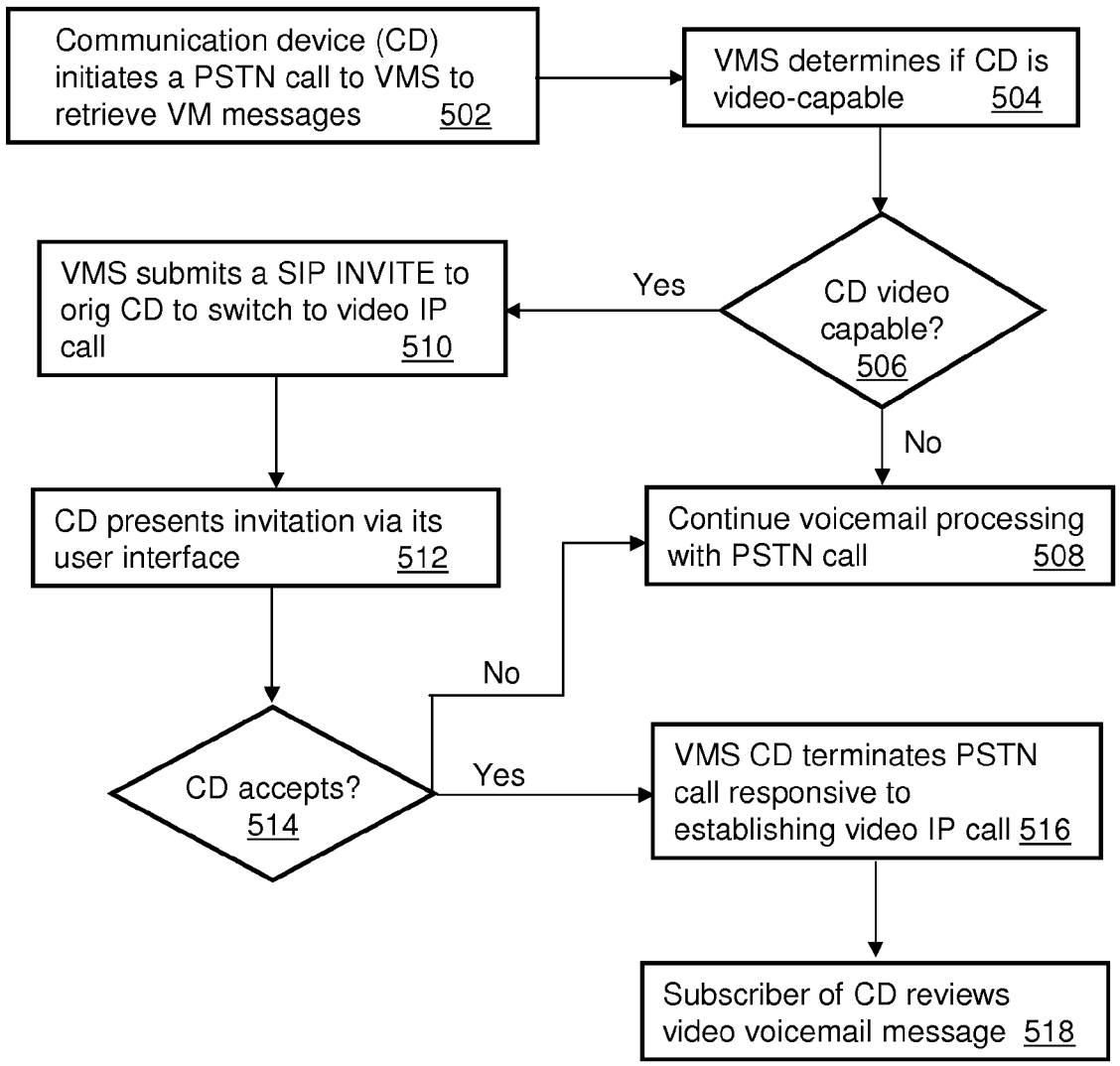

FIG. 5 depicts an exemplary method 500 operating in portions of the communication system 100 for retrieving voicemail messages recorded according to method 400. Method 500 begins with step 502 in which a CD 104 of a subscriber of the VMS 102 initiates a PSTN call with the VMS to retrieve voicemail messages. In step 504 the VMS 102 determines whether the CD 104 is video-capable. It can accomplish this by any of the aforementioned embodiments presented by method 400.

For example, the VMS 102 can retrieve the calling party number from SS7 signaling information and use it to determine whether the CD 104 is known to be video-capable CD. If the calling party number is not recognized, the VMS 102 can submit inquiries to the NMS 106 (or HSS 240) or the ENUM system 230 as previously described in method 400. In cases where the subscriber is calling from a known CD 104 (e.g., his/her cell phone, home phone, or office phone), the VMS 102 can immediately make a determination whether said CD is video-capable based on pre-provisioned information that identifies the capabilities of CDs of the subscriber by calling number. If the subscriber is however calling from a CD 104 unknown to the VMS 102 (e.g., a friend's cell phone), the VMS can submit inquiries to the NMS 106 or ENUM system 230 unless the CD is recognized from a previous exchange.

If the VMS 102 determines the CD 104 is not video-capable in step 506, the VMS proceeds to step 508 where it continues voicemail processing over the PSTN network 103. In this step the VMS 102 presents the CD 104 synthesized speech prompts to navigate the subscriber through the process of retrieving audio-only voicemail messages. If a selected voicemail message is in video format, the VMS 102 will present in step 508 only the audio portion of said video voicemail.

If the VMS 102 however determines the CD 104 is video-capable, it proceeds to step 510 where it submits a SIP INVITE message to the CD. The CD 104 in turn presents in step 512 the invitation to switch to a video IP call by way of its UI 304 as previously described in method 400. If the subscriber of the CD 104 rejects the request the VMS 102 proceeds to step 508. Otherwise, the VMS 102 and CD 104 terminate the PSTN connection in step 516 responsive to establishing a video IP communication session therebetween. The subscriber of the CD 104 can then review in step 518 audio-only and video voicemail messages recorded by the VMS 102.

Figure 6:
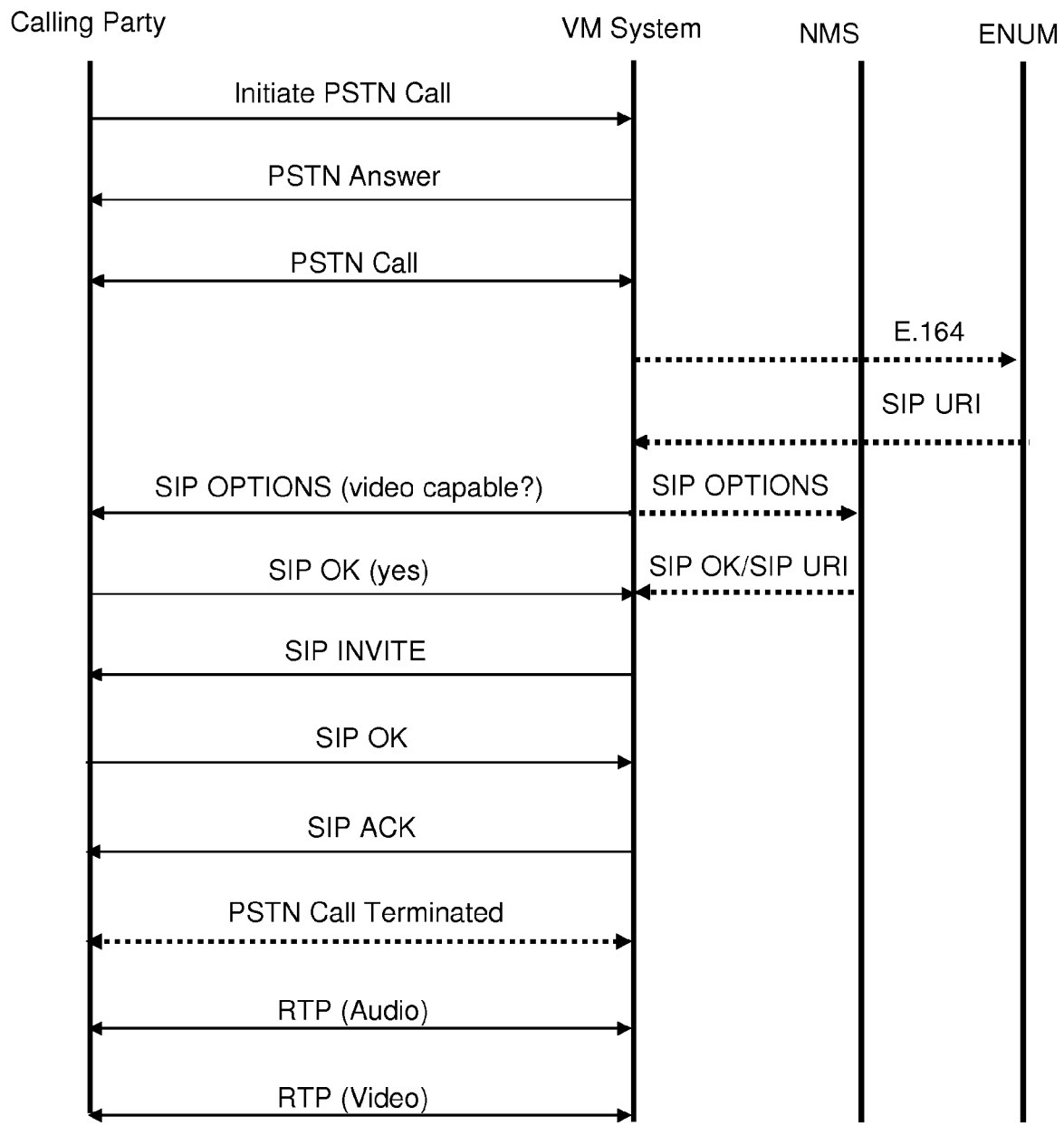
FIG. 6 depicts an exemplary call flow diagram that can be used by the methods of FIGS. 4-5.

FIG. 6 depicts an exemplary embodiment of a call flow diagram for switching from a PSTN to video IP call that can be used by methods 400-500. Call flow begins with a PSTN call initiated by a calling party directed to a terminating CD 104 or the VMS 102 (in the case of a subscriber desiring to retrieve voicemail messages). Once the PSTN call is answered by the VMS 102 (directly or by call redirection), PSTN communications is established between the CD 104 and the VMS. The VMS 102 can then send an E.164 query to the ENUM system 230 to determine the SIP URI of the CD 104. It can then send a SIP OPTIONS request directed to the originating CD 104 by way of its broadband port to determine whether the CD of the calling party is capable of video communications. If the CD 104 is video-capable, a SIP OK message is transmitted by the CD to the VMS 102 acknowledging its capability. Alternatively, the VMS 102 can skip the ENUM query and transmit the SIP OPTIONS message to the NMS 106 to determine if the CD 104 is video capable. If it is, the NMS 106 can respond with a SIP OK message and the SIP URI of the CD 104.

The VMS 102 then transmits a SIP INVITE message to the CD 104 according to its SIP URI. The SIP INVITE can be presented to the calling party according to any number manifestations of the UI 304 of the CD 104. If the calling party accepts the invitation to switch to a video IP call, the CD 104 transmits a SIP OK message, which the VMS 102 acknowledges with a SIP ACK message. At this point, the CD 104 of the calling party and the VMS 102 terminate the PSTN call by common means, and a video IP communication conforming to a Real-Time Protocol (RTP) ensues therebetween.

It would be evident to an artisan with ordinary skill in the art that the embodiments presented can be modified, reduced, or enhanced without departing from the scope and spirit of the claims described below. For example, the call flow diagram can have more or less steps to initiate a PSTN and video IP communication session. Additionally, the process for discovering the capabilities of a CD 104 can be supplied proactively by the CD rather than the VMS 102 having to probe the CD, the NMS 106, the HSS 240, or the ENUM system 230. Consequently, the request to switch to video IP communications can be invoked by either the originating CD 104 or the VMS 102.

These and other suitable modifications can be applied to the present disclosure without departing from the scope of the claims. Accordingly, the reader is directed to the claims for a fuller understanding of the breadth and scope of the present disclosure.

Figure 7:
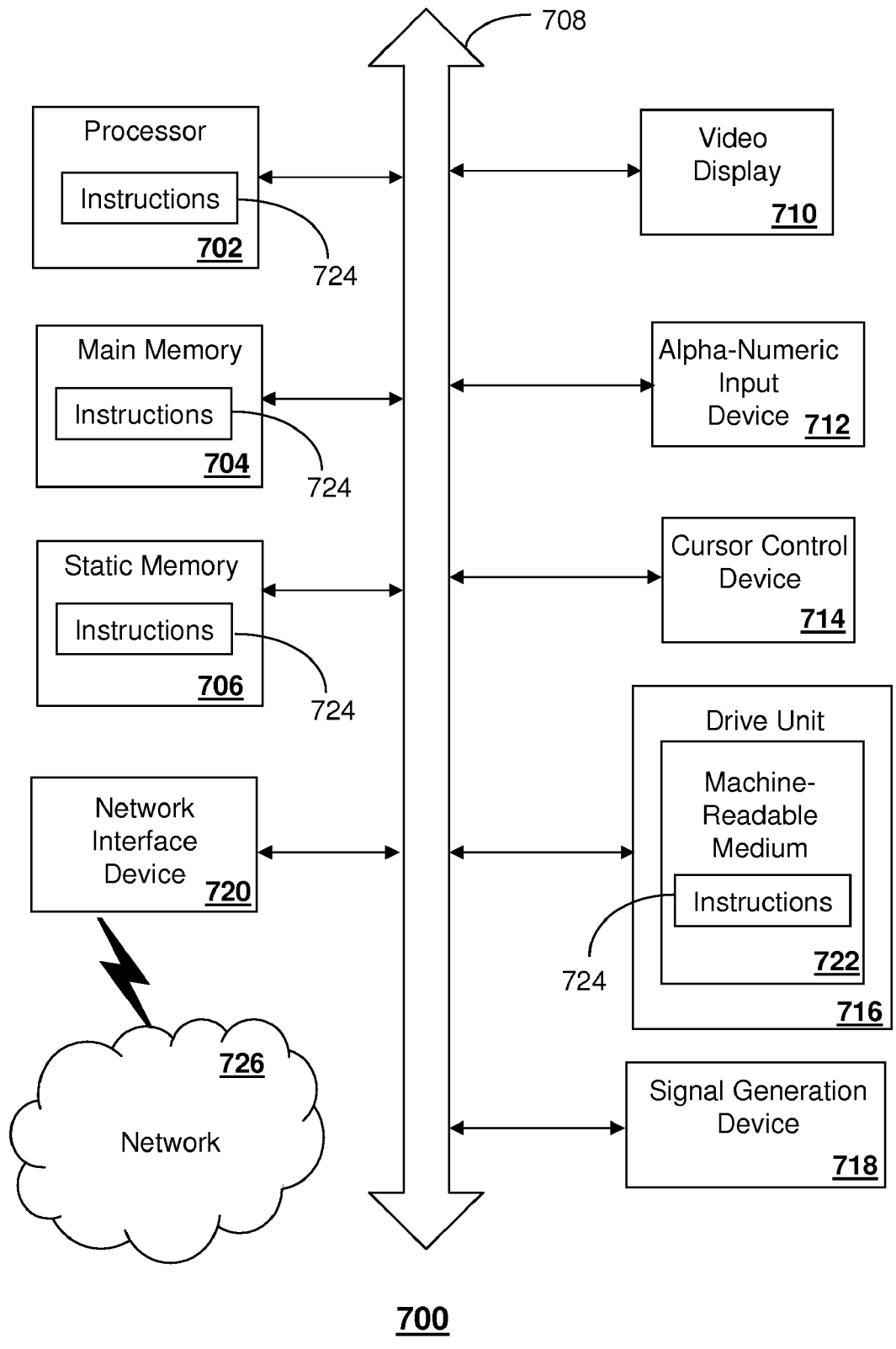
FIG. 7 depicts an exemplary diagrammatic representation of a machine in the form of a computer system within which a set of instructions, when executed, may cause the machine to perform any plurality of the methodologies disclosed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising a memory coupled to a controller, wherein the memory comprises computer instruction, which when executed by the controller, configure the controller to:

establish a voice capable communication session with a voicemail system over a Public Switched Telephone Network by way of a circuit-switched communication port of the communication device;

receive from the voicemail system an invitation to establish a video capable communication session with the voicemail system;

responsive to the received invitation, transmit a Session Initiation Protocol message to the voicemail system to establish the video capable communication session with the voicemail system by way of a packet-switch communication port of the communication device; and transmit to the voicemail system a video message by way of the video capable communication session and for recording by the voicemail system as a video voicemail message.

2. The communication device of claim 1, wherein the computer instructions configure the controller to establish the voice capable communications with the voicemail system responsive to a redirection of a public switched telephone network call initiated by the communication device being redirected to the voicemail system.

3. The communication device of claim 2, wherein the voicemail system transmits the invitation responsive to the voicemail system determining that the communication device is video capable according to a calling party number retrieved from the public switched telephone network call.

4. The communication device of claim 1, wherein the computer instructions configure the controller:

receive a Session Initiation Protocol OPTIONS message from the voicemail system to determine whether the communication device is video capable; and transmit to the voicemail system a Session Initiation Protocol OK message indicating that the communication device is video capable.

5. The communication device of claim 4, wherein the computer instructions configure the controller:

receive from the voicemail system a Session Initiation Protocol INVITE message to switch to video communications over the packet-switched communication port of the communication device; and terminate communications with the voicemail system over the public switched telephone network port responsive to establishing video communications with the voicemail system over the packet-switched communication port.

6. The communication device of claim 1, wherein the computer instructions configure the controller present the invitation by way of a User Interface of the communication device.

7. The communication device of claim 6, wherein the user interface comprises at least one among a display, an illuminable tactile or touch-sensitive button, or an illuminable softkey button presented at the display.

8. The communication device of claim 1, wherein the communication device and the voicemail system operate in an Internet Protocol Multimedia Subsystem communication system.

9. A non-transitory computer-readable storage medium operating in a communication device, comprising computer instructions, which when executed by a processor cause the processor to for: establish a circuit-switched communication session with a voicemail system over a Public Switched Telephone Network; and initiate a transition to a video capable packet-switched communication session communication session with the voicemail system while the circuit-switched communication session is active between the communication device and the voicemail system; and transmit to the voicemail system a video message by way of the video capable packet-switched communication session and for recording by the voicemail system as a video voicemail message.

10. The non-transitory storage medium of claim 9, wherein the circuit-switched communication session comprises a Public Switched Telephone Network communication session, and wherein the communication device and the voicemail system operate in an Internet Protocol Multimedia Subsystem communication system.

11. The non-transitory storage medium of claim 9, comprising computer instructions that cause the processor to terminate the circuit-switched communication session responsive to switching to the video capable packet-switched communication session.

12. The non-transitory storage medium of claim 9, comprising computer instructions that cause the processor to establish communications with the voicemail system responsive to the circuit-switched communication session initiated by the communication device being redirected to the voicemail system.

13. The non-transitory storage medium of claim 9, comprising computer instructions that cause the processor to receive from the voicemail system an invitation to transition to the video capable packet-switched communication session responsive to the voicemail system determining that the communication device is video capable according to a calling party number retrieved from the circuit-switched communication session.

14. The non-transitory storage medium of claim 9, comprising computer instructions that cause the processor to:

receive a Session Initiation Protocol OPTIONS message from the voicemail system to determine whether the communication device is video capable; and transmit to the voicemail system a Session Initiation Protocol OK message indicating it is video capable.

15. The non-transitory storage medium of claim 14, comprising computer instructions that cause the processor to:

receive from the voicemail system a Session Initiation Protocol INVITE message to switch to video communications over packet-switched communication port of the communication device; and terminate communications with the voicemail system over a circuit-switch communication port responsive to establishing the video capable packet-switched communication session with the voicemail system over the packet-switched communication port.

16. The non-transitory storage medium of claim 9, comprising computer instructions that cause the processor to present an invitation received from the voice mail system, wherein the invitation is presented by way of a User Interface of the communication device.

17. The non-transitory storage medium of claim 9, wherein communication device comprises a circuit-switch communication port, and a packet-switched communication port, and wherein the circuit-switched communication session takes place by way of the circuit-switch communication port, and the video capable packet-switched communication session takes place by way of the packet-switched communication port.

18. A voicemail system, comprising a memory coupled to a processor, wherein the memory comprises computer instructions, which when executed by the processor, configure the processor to transmit to a communication device an invitation to switch from an active circuit-switched communication session over a Public Switched Telephone Network to a video Internet Protocol communication session; receive a video message from the communication device over the video Internet Protocol communication session; and record said video message.

19. The voicemail system of claim 18, wherein the computer instructions configure the processor to determine whether the communication device is video capable from a calling party number retrieved during the circuit-switched communication session.

20. The voicemail system of claim 18, wherein the computer instructions configure the processor to:
   transmit a Session Initiation Protocol OPTIONS message to the communication device to determine whether the communication device is video capable; and
   receive from the communication device a Session Initiation Protocol OK message that indicates it is video capable.

21. The voicemail system of claim 20, wherein the computer instructions configure the processor to:
   transmit to the communication device the invitation as a Session Initiation Protocol INVITE message to switch to the video Internet Protocol communication session over a packet-switched communication port of the communication device; and
   terminate the active circuit-switched communication session responsive to establishing the video Internet Protocol communication session with the communication device over the packet-switched communication port.

22. The voicemail system of claim 18, wherein the computer instructions configure the processor:
   establish communications with a second communication device over a second circuit-switched communication session; and
   transmit a second invitation to the second communication device to switch from the second circuit-switched communication session to a second video Internet Protocol communication session.

23. The voicemail system of claim 18, wherein the computer instructions configure the processor to determine that the second communication device is video capable from a calling party number retrieved from the second circuit-switched communication session.

24. The voicemail system of claim 18, wherein the second communication device switches to the second video Internet Protocol communication session responsive to the second invitation, and wherein the computer instructions configure the processor to present the recorded video message to the second communication device.

* * * * *

UNITED STATES PATENT AND TRADEMARK OFFICE
CERTIFICATE OF CORRECTION

PATENT NO. : 8,203,589 B2
APPLICATION NO. : 11/852060
DATED : June 19, 2012
INVENTOR(S) : James Jackson Page 1 of 1

It is certified that error appears in the above-identified patent and that said Letters Patent is hereby corrected as shown below:

On the title page, Item (73) Assignee should read as:
AT&T Intellectual Property I, LP Signed and Sealed this
Thirty-first Day of July, 2012

David J. Kappos
*Director of the United States Patent and Trademark Office*